United States Patent
Rowland et al.

(10) Patent No.: US 8,155,258 B2
(45) Date of Patent: Apr. 10, 2012

(54) FISSION METER

(75) Inventors: Mark S. Rowland, Alamo, CA (US); Neal J. Snyderman, Berkeley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/233,228

(22) Filed: Sep. 21, 2005

(65) Prior Publication Data

US 2007/0230651 A1    Oct. 4, 2007

Related U.S. Application Data

(60) Provisional application No. 60/612,968, filed on Sep. 24, 2004.

(51) Int. Cl.
*G21G 1/00* (2006.01)
(52) U.S. Cl. ......... 376/156; 376/245; 376/253; 376/159
(58) Field of Classification Search .................. 376/158, 376/257, 159, 254, 170, 181, 182, 189, 156, 376/245, 253; 250/390.01, 390.04, 391, 250/269.8
See application file for complete search history.

(56) References Cited

U.S. PATENT DOCUMENTS

| | | | | |
|---|---|---|---|---|
| 3,456,113 A * | 7/1969 | Keepin | ............................ | 376/254 |
| 3,786,256 A * | 1/1974 | Untermyer | ..................... | 376/159 |
| 4,201,912 A | 5/1980 | Evans et al. | | |
| 4,229,654 A * | 10/1980 | Arya et al. | .................. | 250/358.1 |
| 4,350,887 A * | 9/1982 | Barnard et al. | ................ | 250/265 |
| 4,483,816 A * | 11/1984 | Caldwell et al. | ............... | 376/158 |
| 4,617,169 A * | 10/1986 | Brodzinski et al. | ............ | 376/257 |
| 4,617,466 A * | 10/1986 | Menlove et al. | .......... | 250/390.04 |
| 4,920,548 A * | 4/1990 | Gaussa et al. | ................... | 376/255 |
| 6,333,958 B1 * | 12/2001 | Stewart et al. | ................... | 377/10 |
| 6,341,150 B1 * | 1/2002 | Ivanov et al. | .................. | 376/159 |
| 6,509,563 B1 * | 1/2003 | McElroy et al. | ............... | 250/291 |
| 2005/0105665 A1 | 5/2005 | Grodzins et al. | | |
| 2006/0081787 A1* | 4/2006 | Prasad et al. | ................... | 250/391 |

FOREIGN PATENT DOCUMENTS

JP    6-300887    10/1994

OTHER PUBLICATIONS

Prasad, M. K. et al., Satistical Theory of Fission Chains and Generalized Poisson Neutron Counting Ditributions, pp. 1-41 University of California. Lawrence Livermore National Laboratory. Apr. 16, 2002.*

Frank, M. I. et al. Application of Neutron Correlation Techniques to Warhead Authentication: Feasibility and Conceptual Requirements—Monte Carlo Simulations and Statistical Analysis, pp. 1-25. University of California. Lawrence Livermore National Laboratory. Aug. 13, 2004.*

(Continued)

*Primary Examiner* — Ricardo Palabrica
(74) *Attorney, Agent, or Firm* — Dergosits & Noah LLP

(57) ABSTRACT

A neutron detector system for discriminating fissile material from non-fissile material wherein a digital data acquisition unit collects data at high rate, and in real-time processes large volumes of data directly into information that a first responder can use to discriminate materials. The system comprises counting neutrons from the unknown source and detecting excess grouped neutrons to identify fission in the unknown source.

6 Claims, 2 Drawing Sheets

OTHER PUBLICATIONS

Ensslin et al., "Application Guide to Neutron Multiplicity Counting", LA-13422-M, UC-700, Nov. 1998.*

Hicks et al. "Probabilities of Promt-Neutron Emission from Spontaneous Fission", Physical Review, 101, 1016-1020, 1956.*

Frank et al. UCRL-TR-206043, Aug. 13, 2004.*

Murata et al., "Direct neutron spectrum measurement to validate natZr(n,2n) reaction cross-section at 14 MeV", Fusion Engineering and Design 84, pp. 1376-'79 (2009).*

Estes et al., "Subcritical Multiplication Determination Studies", Los Alamos National Laboratory Document LA-UR-95/2016.*

Hage, W., et al., "Correlation Analysis with Neutron Count Distributions in Randomly or Signal Triggered Time Intervals for Assay of Special Fissile Materials," Nuclear Science and Engineering, 89, pp. 159-176, (1985).

Feynman, R.P., et al., "Dispersion of the Neutron Emission in U-235 Fission," J. Nuclear Energy, vol. 3, pp. 64-69 (1956).

Furuhashi, A., et al., "Third Moment of the Number of Neutrons Detected in Short Time Intervals," J. of Nuclear Science and Tech., 5 (2) p. 48-59, Feb. 1968.

* cited by examiner

US 8,155,258 B2

FISSION METER

CROSS-REFERENCE TO RELATED APPLICATIONS

This application claims the benefit of U.S. Provisional Patent Application No. 60/612,968 filed by Mark S. Rowland and Neal J. Snyderman Sep. 24, 2004 and titled "Fission Meter." U.S. Provisional Patent Application No. 60/612,968 filed Sep. 24, 2004 is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to fission and more particularly to a system for identifying when fission occurs.

2. State of Technology

United States Patent Application No. 2005/0105665 by Lee Grodzins and Peter Rothschild for a system of detection of neutrons and sources of radioactive material, published May 19, 2005, provides the following state of technology information: "There is a need to find sources of radiation and other nuclear material that are clandestinely transported across national boundaries. The sources of clandestine nuclear material may be in the form of "dirty bombs" (e.g., a conventional explosive combined with radioactive nuclides designed to spread radioactive contamination upon detonation), fissile material, and other neutron and radiation emitting sources that may present a hazard to the public. During recent years, the United States government has placed mobile vehicles at strategic areas with gamma ray detectors dedicated to the task of finding fissile material. Atomic explosives may be made from $^{235}$U, a rare, naturally occurring, isotope of uranium that lives almost $10^9$ years, or $^{239}$Pu, a reactor-made isotope that lives more than $10^4$ years. $^{235}$U decays with the emission of gamma ray photons (also referred to as 'gammas'), principally at 185.6 keV and 205.3 keV. $^{239}$Pu emits a number of gamma rays when it decays, the principal ones being at 375 keV and 413.7 keV. These gamma rays are unique signatures for the respective isotopes. But fissile material invariably contains other radioactive isotopes besides those essential for nuclear explosives. For example, weapons grade uranium may contain as little as 20% $^{235}$U; the rest of the uranium consists of other isotopes. The other uranium and plutonium isotopes reveal their presence by gamma rays emitted by their daughters. For example, a daughter of $^{238}$U emits a high energy gamma ray at 1,001 keV; a daughter of $^{232}$U, an isotope present in fissile material made in the former USSR, emits a very penetrating gamma ray at 2,614 keV; and a daughter of $^{241}$Pu emits gamma rays of 662.4 keV and 722.5 keV."

U.S. Pat. No. 4,201,912 issued May 6, 1980 to Michael L. Evans et al and assigned to The United States of America as represented by the United States Department of Energy, provides the following state of technology information: "A device for detecting fissionable material such as uranium in low concentrations by interrogating with photoneutrons at energy levels below 500 keV, and typically about 26 keV. Induced fast neutrons having energies above 500 keV by the interrogated fissionable material are detected by a liquid scintillator or recoil proportional counter which is sensitive to the induced fast neutrons. Since the induced fast neutrons are proportional to the concentration of fissionable material, detection of induced fast neutrons indicates concentration of the fissionable material."

U.S. Pat. No. 3,456,113 issued Jul. 15, 1969 to G. Robert Keepin and assigned to the United States of America as represented by the United States Atomic Energy Commission, provides the following state of technology information: "An apparatus and method of detecting, identifying and quantitatively analyzing the individual isotopes in unknown mixtures of fissionable materials. A neutron source irradiates the unknown mixture and the kinetic behavior of the delayed neutron activity from the system is analyzed with a neutron detector and time analyzer. From the known delayed neutron response of the individual fission species it is possible to determine the composition of the unknown mixture. Analysis of the kinetic response may be accomplished by a simple on-line computer enabling direct readout of isotopic assay."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a neutron detection system that can be used to discriminate fissile material from non-fissile material. It comprises a low cost digital data acquisition unit that collects data at high rate and in real-time processes large volumes of data directly into information that a first responder can use to discriminate materials.

The standard approach to locating neutron sources is to use a neutron detector to look for count rate increases above background. Given the number of legitimate neutron sources used in industry, deploying standard neutron detectors will result in a large number of alarms that will need to be resolved by more intrusive inspections. The present invention provides a simple way to discriminate the commonly used neutron sources from illicit (fissile) neutron sources. This technique functions in a passive mode much like a standard portal monitor. The present invention also provides systems for converting the technique to an active interrogation scheme.

The present invention provides a system for identifying when fission is occurring by looking for the range of simultaneous neutrons. Fission is defined as the emission of multiple neutrons after an unstable nucleus disintegrates. For example, Pu240 decays at a rate of about 400 fissions per second per gram of Pu240 atoms. When the fission occurs, multiple neutrons are emitted simultaneously, with the number ranging from zero to eight neutrons. This simultaneous neutron emission characteristic is unique to fission.

The present invention provides a method of identifying fission from an unknown source. The method comprises the steps of counting neutrons from the unknown source and detecting excess grouped neutrons to identify fission in the unknown source. In one embodiment the step of detecting excess grouped neutrons includes plotting a poisson count distribution on top of a measured count distribution, such that the mean count of the data is the same as that of the poisson curve, and discerning differences attributed to fission in the unknown source.

The present invention also provides a fission meter apparatus for identifying fission from an unknown source. The fission meter apparatus comprises a multiplicity counter that looks for a range of excess neutrons from the unknown source, a neutron detector operatively connected to the multiplicity counter, and a calculating system operatively connected to the neutron detector that is set up to compute a difference between actual and expected neutron group sizes, which when positive identifies fission in the unknown source. In one embodiment the calculating system is a system for plotting a poisson count distribution on top of a measured count distribution, such that the mean count of the data is the same as that of the poisson curve.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
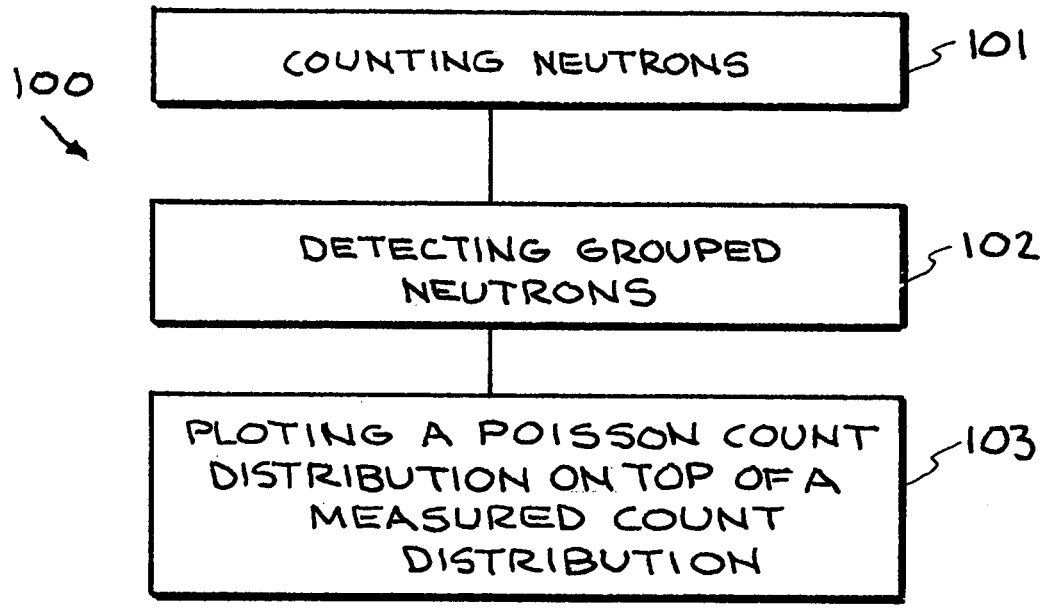
FIG. 1 illustrates one embodiment of a system constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring to the drawings and in particular to FIG. 1, one embodiment of a system of the present invention is illustrated. This embodiment of the system is designated generally by the reference numeral 100. The system 100 comprises, step 101 counting neutrons, step 102 detecting grouped neutrons, and step 103 plotting a Poisson count distribution on top of a measured count distribution. An embodiment of the system 100 comprises plotting a Poisson count distribution on top of a measured count distribution, such that the mean count of the data is the same as that of the Poisson curve, and discerning differences attributed to fission in the unknown source.

The system 100 can be used for mobile or stationary monitoring and characterization of the type of neutron sources inside packages. Some examples of uses of the system 100 include inspection of packed cargo containers and trucks. The present invention can be used for preventing illicit trafficking of fissioning nuclear material, can be used for the management of inventories of nuclear material, and can be used for management of waste streams of nuclear material. The system 100 is particularly useful where the desire is to have a simple, quick approach that minimally trained operators can use to improve the control of fissioning material.

Fission is defined as the emission of multiple neutrons after an unstable nucleus disintegrates. For example, Pu240 decays at a rate of about 400 fissions per second per gram of Pu240 atoms. When the fission occurs, multiple neutrons are emitted simultaneously, with the number ranging from zero to eight neutrons. The present invention provides a system that can be used to identifying when fission occurs by looking for the range of simultaneous neutrons. This simultaneous neutron emission characteristic is unique to fission. To see the simultaneous neutrons, Applicants have built a multiplicity counter and a neutron detector that is set up to see time grouped neutrons.

The system 100 has many uses. For example, one use of the system 100 comprises preventing illicit trafficking of fissioning nuclear material. Another use of the system 100 comprises management of inventories of nuclear material. Another use of the system 100 comprises management of waste streams of nuclear material. The system 100 is particularly useful where the desire is to have a simple, quick approach that minimally trained operators can use to improve the control of fissioning material. The operators, for example may include border or traffic police, baggage handlers or freight companies, or for international treaty agreements that endeavor to identify, segregate, or manage the world's inventories of nuclear material.

Figure 2:
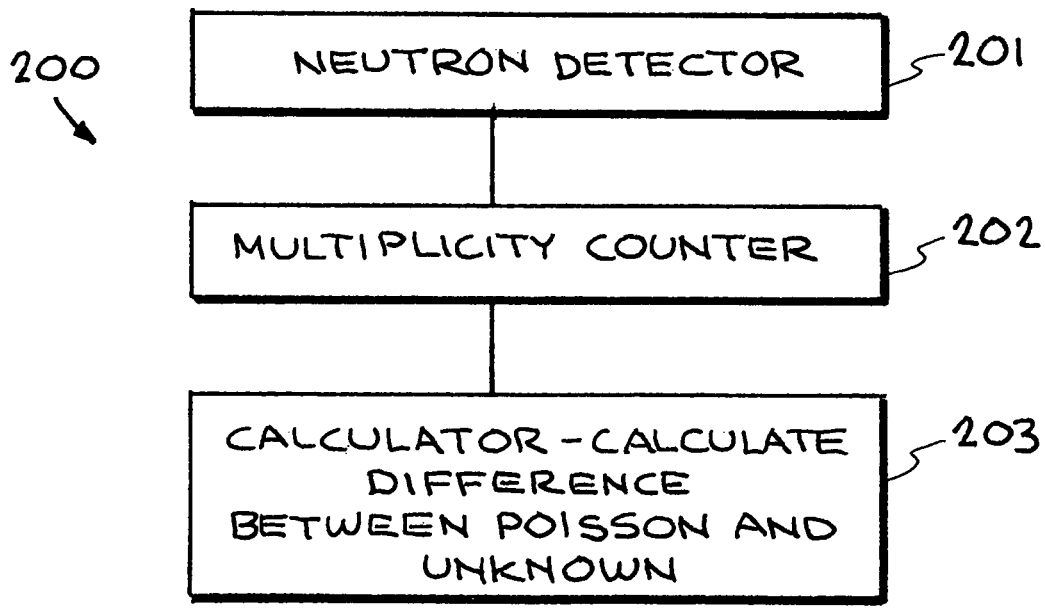
FIG. 2 illustrates another embodiment of a system constructed in accordance with the present invention.

Referring now to FIG. 2, another embodiment of a system constructed in accordance with the present invention is illustrated. This embodiment of the system is designated generally by the reference numeral 200. The system 200 comprises a number of interconnected the structural components. A neutron detector 201 detects neutrons, a multiplicity counter 201 looks for a range of simultaneous neutrons from the unknown source. A calculator 203 calculates the difference between Poisson and unknown. The neutron detector 201 is operatively connected to the multiplicity counter 202. The calculator 203 is operatively connected to the multiplicity counter 202 and is set up to see time grouped neutrons to see simultaneous neutrons and identify fission from the unknown source.

The system 200 provides a simple way to discriminate the commonly used neutron sources from illicit (fissile) neutron sources. The system 200 comprises a fission meter apparatus for identifying fission from an unknown source. The fission meter apparatus 200 comprises a multiplicity counter 202 that looks for a range of excess neutrons from the unknown source, a neutron detector 201 operatively connected to the multiplicity counter, and a calculating system 203 operatively connected to the multiplicity counter 202 that is set up to compute a difference between actual and expected neutron group sizes, which when positive identifies fission in the unknown source. In one embodiment the calculating system is a system for plotting a Poisson count distribution on top of a measured count distribution, such that the mean count of the data is the same as that of the Poisson curve.

In one embodiment of the system 200, the plotting system 203 is a system for plotting a count distribution on top of a measured count distribution, such that the mean count of the data is the same as that of the Poisson curve. In one embodiment of the system 200, the plotting system 203 is a computer.

The system 200 provides a neutron detector that can be used to discriminate fissile material from non-fissile material. It comprises a low cost digital data acquisition unit that collects data at high rate, and in real-time processes large volumes of data directly into information that a first responder can use to discriminate materials.

Figure 3:
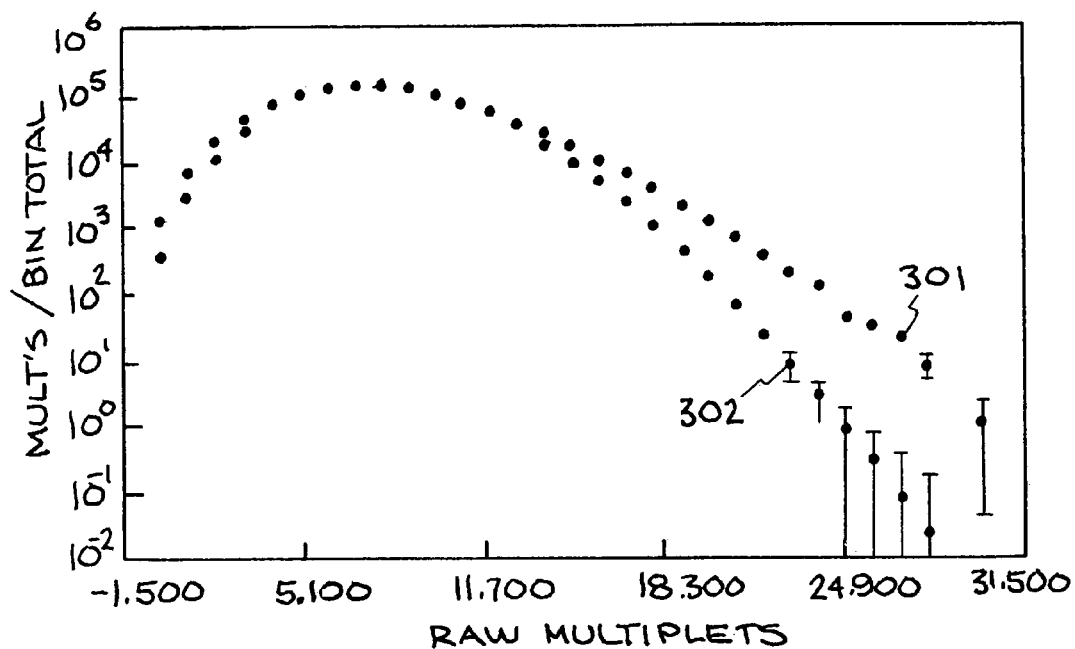
FIG. 3 shows a plot of a Poisson count distribution on top of the measured count distribution.

Referring now to FIG. 3, a plot further illustrates the embodiments 100 and 200. The plot is designated generally by the reference numeral 300. The top curve 301 is a count distribution of the frequency of neutrons counted in the 512 microsecond count gate. For example, 8 neutrons were observed $10^5$ times and 25 neutrons were observed about 100 times. The bottom curve 302 is a Poisson count distribution with the same mean count, i.e., about 7. Note the increase in frequency of data above the Poisson points. If an operator sees such an excess, either visually or via a numerical subtraction, then fission is identified.

The systems 100 and 200 comprise a first step of counting neutrons from the unknown source and a second step of detecting excess grouped neutrons to identify fission in the unknown source. In another embodiment the systems 100 and 200 comprise the steps of counting neutrons from the unknown source and detecting excess grouped neutrons to identify fission in the unknown source wherein said step of detecting excess grouped neutrons to identify fission in the unknown source includes plotting a Poisson count distribution on top of a measured count distribution, such that the mean count of the data is the same as that of the Poisson curve, and discerning differences attributed to fission in the unknown source. In another embodiment the systems 100 and 200 comprise the steps of counting neutrons from the unknown source and detecting excess grouped neutrons to identify fission in the unknown source includes plotting a Poisson count distribution on top of a measured count distribution, such that the mean count of the data is the same as that of the Poisson curve, and discerning differences attributed to fission in the unknown source and wherein said step of discerning differences attributed to fission in the unknown source comprises discerning visible differences in said Poisson count distribution on top of a measured count distribution plot that are attributed to fission in the unknown source.

Neutrons are used in many industrial applications. Neutron signatures also indicate the presence of fissioning nuclear material. It is desirable to be able to separate benign industrial neutron sources from fission sources. Detection of nuclear material has been accomplished by neutron counting. If neutron sources were rare, the misinterpretation of any neutron source as a fission source would be of little consequence. With the large scale introduction of nuclear monitoring equipment in daily commerce comes the need to not confuse the traffic of industrial sources with illicit traffic.

The systems 100 and 200 provide (1) Visual comparison of raw count distribution data, to a Poisson distribution with the same mean count, show graphically the intuitive sense that the characteristic of fission is present. (2) Optimally, the excess correlation, above a Poisson rate of correlation, may be alternatively or supplementarily provided by observing that numerical characteristics of the data and the corresponding Poisson distribution may be computed to form a numerical difference, redundantly indicative of fission.

The characteristic of fission is that neutrons emit in groups. Random sources of neutrons are emitted with no regard for grouping; however, since the appearance of these neutrons at the detector are randomly spread in time, some may accidentally appear in close temporal proximity. Imagine a neutron detector that counts neutrons for short periods of time, say ½ milli-second. This example time corresponds to a typical neutron diffusion time in a typical detector, the choice of which depends on the detector design and is not the subject here. If the ½ msec. Period is counted once, the count may be three counts, or some other integer number, including zero. One is expected to select an appropriate observation time, two to three times the typical neutron diffusion time, and then repeat the sampling of counts period many times to produce a histogram of counts described as the number of occurrences of each multiplet group. (i.e., number of times 0, 1, 2, 3 . . . were observed, in sum, over say 10,000 repeated detection periods.)

Fission is unique in that it creates real correlations, while non-fission neutron sources create accidental correlations. Unrecognized is the relative histogram comparison of the measured or unknown neutron source, with a mathematically generated count histogram that represents the hypothetical case of no fission. Visually, in isolation, one histogram looks like another. It is the simplicity of a relative comparison that makes the fission meter idea so unique. It is highly desired operational simplicity that the histogram, to compare a measured histogram to, is derivable from the characteristics of the measured unknown. Graphically, this is illustrated in FIG. 3. Note the tail of the histogram is above the random or Poisson histogram. This excess correlation is due to fission, illustrating that a simple plot of data collected in one measurement, can be analyzed with an intuitive procedure requiring no mathematical skills. Alternatively, it is possible to compute various quantities, any of which are now motivated by this invention.

One example of an alternative embodiment to the histogram overplot concept is to numerically compute quantities based on the single measurement of an unknown. Conceptually, the objective is to realize that the differences apparent in a comparison of histograms may be described as the number of pairs of counts observed in the unknown minus the number of count pairs expected if there were no fission (but the neutrons came from a non-fissioning neutron source).

# of pairs observed−expected random # of pairs

If the difference is zero, then the observed neutron source is not fissioning. The number of pairs is only one example of a statistical quantity derivable from the measured histogram. Others might be the third or fourth moment of the histogram.

The alternative embodiment, to the graphical histogram approach, that will be illustrated here will involve the number of pairs of neutrons. As stated above, pairs of neutrons in excess of those expected is the test. Numerically this may be computed from the measured histogram:

$$\sum_{n=0}^{\infty} \frac{\frac{n(n-1)}{2}}{2\sum_{n=0}^{\infty} Cn} Cn - \left(\frac{\sum_{n=0}^{\infty} nCn}{\sum_{n=0}^{\infty} Cn}\right)^2 .1/2$$

This difference represents the absolute number of pairs in excess of that expected from a non-fissioning neutron source.

Terms:

n is the x-axis of the histogram and is the size of the group of neutrons observed.

Cn is the number of times that a group of n neutrons was observed after repeating the ½ msec. measurement a large number of times. Note that the mean count of the measured histogram defines the histogram of the expected or hypothetical non-fission histogram. The mean count of the measurement is:

$$c\text{-}bar = \overline{C} = \frac{\sum_{n=0}^{\infty} nCn}{\sum_{n=0}^{\infty} Cn}$$

The histogram expected from a non-fission source will have the same C-bar, however the shape of the histogram will be described by:

$$Cn\text{-}poisson = \frac{c^{-n}}{n!}e^{-\overline{c}}$$

Where n is the count group size. Whether we simply plot Cn Poisson on top of the measurement, as in the first embodiment, or compute difference quantities, as in the second embodiment, they represent the same insight that a uniquely observable fission neutron signature can be created from a single measurement, and can be useable by minimally trained operators to separate high value objects from common industrial sources.

Figure 4:
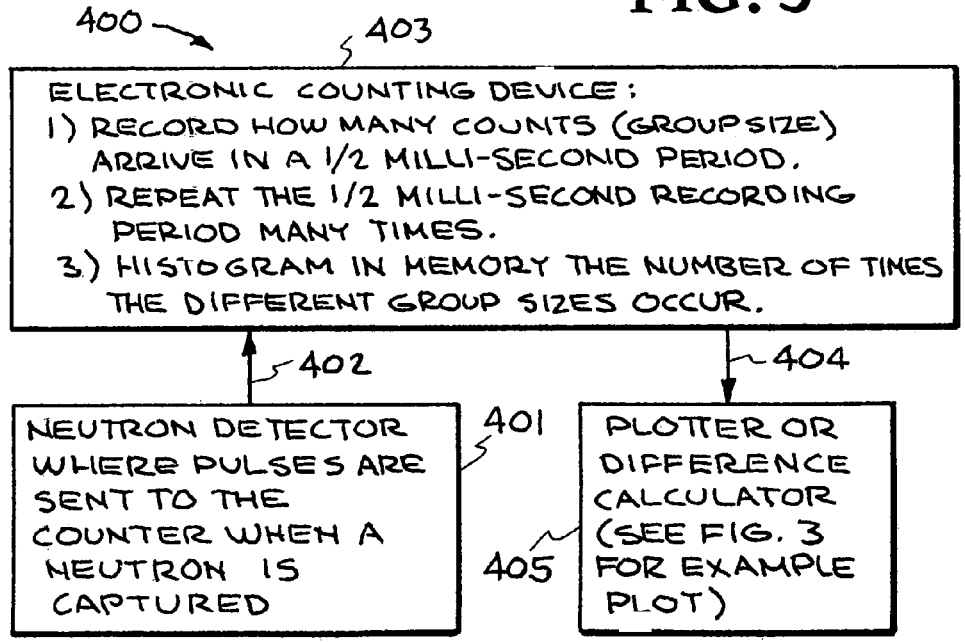
FIG. 4 illustrates another embodiment of a system constructed in accordance with the present invention.

Referring now to FIG. 4, another embodiment of a system constructed in accordance with the present invention is illustrated. This embodiment of the system is designated generally by the reference numeral 400. The neutron detector 401 detects neutrons. The neutron detector 401 is operatively connected to a counter 403. The arrow 402 illustrates pulses sent from the detector 401 to the counter 403. Pulses are sent to the counter 403 when neutrons are captured.

The counter 402 and is set up to see time grouped neutrons to see simultaneous neutrons and identify fission from the unknown source. The counter 402 (1) can record how many counts (group size) arrive in a ½ milli-second period, (2) repeat the 1.2 milli-second recording period many times, and (3) histogram in memory the number of times the different group sizes occur.

The counter 403 is operatively connected to a plotter or difference calculator 405. The arrow 402 illustrates information from the counter 403 being sent the plotter or difference calculator 405. The system 400 provides a simple way to discriminate the commonly used neutron sources from illicit (fissile) neutron sources. In one embodiment a system plots a Poisson count distribution on top of a measured count distribution, such that the mean count of the data is the same as that of the Poisson curve.

The present invention is particularly useful where the desire is to have a simple, quick approach that minimally trained operators can use to improve the control of fissioning material. The operators, for example may include border or traffic police, baggage handlers or freight companies, or for international treaty agreements that endeavor to identify, segregate, or manage the world's inventories of nuclear material.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of determining whether a radiation source has the characteristic of fission, comprising:
    counting neutrons emitted from the radiation source;
    defining a measurement time period;
    determining the number of times that a plurality of neutrons was simultaneously emitted from the radiation source within each measurement time period after the measurement time period is repeated a defined number of times to derive a neutron count measurement that indicates a number of times a simultaneously emitted group of neutrons was observed per measurement time period;
    producing a measured histogram corresponding to the neutron count measurement;
    deriving a Poisson count distribution for a hypothetical Poisson neutron source, wherein the Poisson count distribution represents a count distribution histogram for a random source;
    overlaying the measured histogram and the Poisson count distribution histogram with the mean count of the measured histogram in the same position as the mean count of the Poisson distribution histogram; and
    determining whether the number of times a particular number of simultaneously emitted group of neutrons was observed in the measured histogram is at least ten times greater than the Poisson count distribution for the group of neutrons at a portion of the measured histogram above the mean count value, and characterizing the source as fissile if so.

2. The method of claim 1 wherein the defined measurement time period is ½ msec.

3. The method of claim 2 wherein the radiation source may be a fissile source that creates real correlations between emitted neutrons, as distinct from a non-fissile source that creates no correlation or only accidental correlations between emitted neutrons.

4. A method comprising:
    measuring the number of a plurality of neutrons simultaneously emitted from a radiation source during a defined number of measurement time periods to derive a multiplet count distribution;
    computing the mean count rate of the multiplet count distribution;
    producing a histogram for a Poisson distribution having the same mean count rate of the multiplet count distribution, wherein the Poisson count distribution represents a count distribution histogram for a random source;
    producing a measured histogram for the count measurement;
    overlaying the measured histogram and the Poisson count distribution histogram; and
    determining whether the number of multiplets per measurement time period for a particular number of simultaneously emitted neutrons was observed in the measured histogram is at least ten times greater than the Poisson count distribution for the same particular number of simultaneously emitted neutrons at a portion of the measured histogram above the mean count rate, and characterizing the radiation source as fissile if so.

5. The method of claim 4 further comprising the step of determining the value of a coefficient, Cn, which represents the number of times that a group of n neutrons is observed after repeating a ½ millisecond measurement time period a defined number of times, and wherein the mean count is calculated by the formula:

$$\overline{C} = \frac{\sum_{n=0}^{\infty} nCn}{\sum_{n=0}^{\infty} Cn}.$$

6. The method of claim 4 wherein the shape of the histogram representation of the count measurement is given by the formula:

$$Cn - \text{poisson} = \frac{\overline{C}^n}{n!} e^{-\overline{C}}.$$

* * * * *